United States Patent [19]

Lian et al.

[11] Patent Number: 5,414,578
[45] Date of Patent: May 9, 1995

[54] VOICE COIL SERVO MOTOR FOR ADJUSTING MAGNETIC HEAD

[75] Inventors: Ragnar Lian, Vettre; Lars Simonsen, Osteras, both of Norway

[73] Assignee: Tandberg Data Storage A/S, Oslo, Norway

[21] Appl. No.: 122,366

[22] Filed: Sep. 15, 1993

[51] Int. Cl.$^6$ .......................... G11B 5/55; G11B 21/08
[52] U.S. Cl. ............................. 360/106; 360/109
[58] Field of Search .............. 360/106, 105, 109, 128; 369/44.22, 223, 244, 247

[56] References Cited

U.S. PATENT DOCUMENTS

| | | | |
|---|---|---|---|
| 4,030,137 | 6/1977 | Dalziel | 360/106 |
| 4,491,890 | 1/1985 | Rudi | 360/106 |
| 4,868,432 | 9/1989 | Frandsen | 360/106 |
| 5,280,402 | 1/1994 | Anderson et al. | 360/106 |

FOREIGN PATENT DOCUMENTS 0243164  10/1987  European Pat. Off. ............ 360/106

*Primary Examiner*—Stuart S. Levy
*Assistant Examiner*—William R. Korzuch
*Attorney, Agent, or Firm*—Hill, Steadman & Simpson

[57] ABSTRACT

A head positioning assembly having a magnet housing and fixed suspension vertically positionable by a worm gear/screw shaft arrangement and further positionable for fine tuning by a magnet mounted within the magnet housing and an electrical coil surrounding the magnet and attached to a head mount structure holding the magnetic head. The head mount structure is fine-tuned, vertically positionable with respect to the magnet housing by magnetic force on the coil induced by select and varying electrical current through the coil.

15 Claims, 2 Drawing Sheets

VOICE COIL SERVO MOTOR FOR ADJUSTING MAGNETIC HEAD

BACKGROUND OF THE INVENTION

The present invention relates to an apparatus for accurately positioning read/write heads of a magnetic read/write unit very precisely relative to the closely packed data tracks of the magnetic tape to insure that data is written onto, or read from, a desired select track. Since the data and tracks run parallel to the length of the tape (i.e., parallel to the transport direction), the read/write head must be moved in both directions (e.g., up and down) perpendicular to the transport direction.

A device for positioning a magnetic head relative to tracks of magnetic tape in a magnetic tape read/write unit is described in U.S. Pat. No. 4,491,890 and U.S. Pat. No. 4,609,959. With this known arrangement, the positioning of a magnetic head occurs by the employment of a worm drive and a screw drive connected to a drive motor which can be a DC motor or stepping motor.

In U.S. Pat. No. 4,609,959 a magnetic head disposed on a magnetic head carrier is positionable by means of a worm drive means and a screw drive means wherein the worm drive is formed of a worm spindle gear driven by a drive motor and associated with a worm wheel gear, and the screw drive is formed by an inside thread of the worm wheel and an associated outside thread on a shaft. The shaft is mounted in a fixed manner to the housing frame of the tape recorder. The magnetic head carrier is arranged so as to be displaceably disposed on the shaft and non-positively connected to the worm wheel, thus securing the magnetic head carrier against rotation during the rotation of the worm wheel, but allowing the head carrier to follow the axial motion of the worm wheel.

It is advantageous to provide a reliable mechanism for rapid, reliable fine tuned positioning of a magnetic head with respect to magnetic tape tracks.

SUMMARY OF THE INVENTION

It is an object of the invention to utilize a wound coil and magnet position actuator to accurately position a magnetic read/write head with respect to magnetic tape and in particular with respect to tracks applied in a transverse direction along the magnetic tape.

The invention provides a servo system for adjusting a magnetic head with respect to a streamer-tape which utilizes a moving coil linear actuator mounted to the head. The arrangement is similar to that used for a typical voice coil for a diaphragm loudspeaker.

A further object of the present invention is to reduce the spread of magnetic stray fields from a "voice coil" servo system, particularly where it originates at the magnet to a level at which the field will not be a significant error contributor, rather than design different types of secondary shielding with respect to the magnet. Magnetic stray fields can damage the magnetic resistive elements in the thin film head, and cause a significant decay of the recorded data on the tape.

The magnet housing for the "voice coil" is designed with its opening facing downwardly beneath the magnetic head. Thus, magnetic stray field from the servo motor magnet will not have a great influence on the tape and magnetic head, and a potential signal decay of the recorded data is avoided as a result.

In operation, an alternating current is connected to a coil which moves in a magnet housing. The force exerted on the coil by the magnetic field is transferred to the magnetic head via coil holders and a head mount. These moving parts are held by a suspension consisting of two springs and a damping mechanism.

The apparatus achieves the objects inventively in that the magnet housing is also used for magnetic shielding. This object is achieved by turning the magnet and opening of the magnet gap where the coil moves, away from the magnetic head and allowing for a broader magnet gap-overhang design. The magnet housing has a large platform around the gap to make a landing zone of the magnetic stray field under the tape. The coil can be less than 20 mm in diameter.

DETAILED DESCRIPTION OF THE PREFERRED EMBODIMENTS

Figure 1:
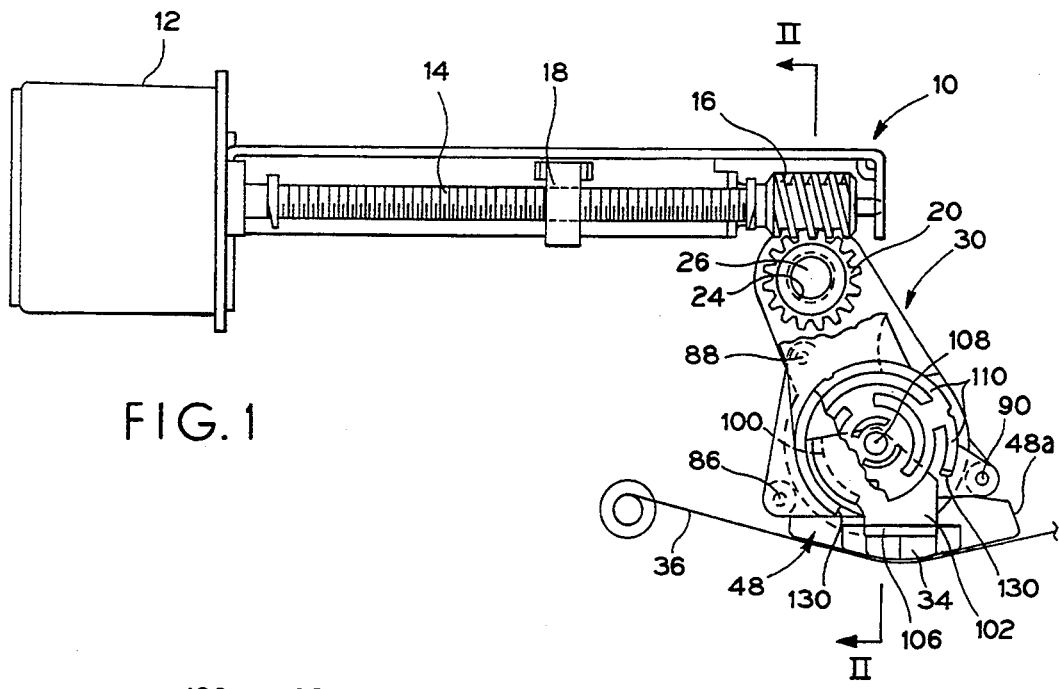
FIG. 1 is a plan view of a head positioning mechanism of the present invention with portions removed for clarity.

FIG. 1 illustrates a head positioning apparatus 10 for a magnetic read/write unit, which features a step motor 12 driving a screw shaft 14 which drives a worm gear 16. A counter nut 18 transverses the screw shaft 14 and provides an adjustable stop for limiting turning of the screw shaft 14. The worm gear 16 turns a worm wheel 20 which provides an internal threaded bore 24 surrounding a threaded shaft 26. The threaded shaft 26 is journaled through a head carrying assembly 30. The assembly 30 carries a magnetic head 34 which fronts a magnetic tape 36 carried within a magnetic tape cartridge, the cartridge placed within the read/write unit.

Figure 2:
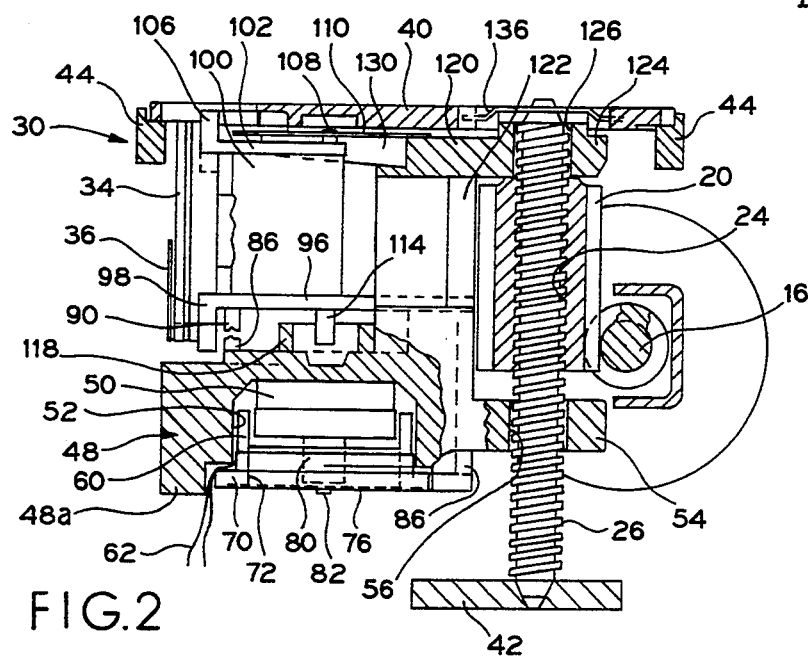
FIG. 2 is a sectional view taken generally along line II—II of FIG. 1.

FIG. 2 illustrates the assembly 30 suspended between an adjustment plate 40 and a base 42. The adjustment plate is supported on structure 44 of the apparatus for carrying the assembly 10. The base 42 and the structure 44 can be structure of a swingable bridge which pivots to bring the head into contact with the tape. The head assembly provides a magnet housing 48 holding a magnet 50 within a recess 52 of the magnet housing. The magnet can be a permanent magnet. The magnetic housing 48 extends laterally in a front wall or platform 48a which underlines the magnetic head 34. The magnet housing extends into a bottom flange 54 having an aperture 56 for journaling the shaft 26 therein. The aperture 56 is not threaded.

Surrounding the magnet 50 is a coil 60 having leads 62 for passing a current through the coil. The coil 60 and the magnet 50 function similar to a loud speaker voice coil, that is, applying current in different current directions through the coil will result in different forced movement of the coil up or down with respect to the magnet 50. The coil 60 is held on a coil holder 70 which has a concentric bore 72 therethrough. A first spider spring member 76 is applied to the coil holder 70 around the circumference of the bore 72, fastened thereto. A rod 80 extends downwardly from the magnet 50 and is fixed to the first spider spring 76 at a knob 82 such as by adhesive or a press fit. The coil holder 70 extends upward in three columns 86, 88 and 90 to an intermediate platform 96. Extending from the intermediate platform 96 is a head holding lug 98, turned downwardly. A wall member 100 extends from the intermediate platform up to an upper platform 102. The upper platform 102 extends into an upper head mounting lug 106 which turns upwardly and downwardly. The head 34 is mounted to the upper lug 106 and the lower lug 98. The upper platform 102 provides an upwardly extending stud 108. The stud 108 mounts a second spider spring 110. The lower platform 96 provides a second stud 114 which extends into a cup-shaped damping mechanism 118. The damping mechanism holds a high viscosity fluid which inhibits rapid movement of the stud 114 within the mechanism 118 and thus damps the movement of the magnetic head with respect to the magnet housing. The damping mechanism can be provided with a closure to retain the fluid therein.

Mounted on top of the magnet housing 48 horizontally arranged is a suspension member 120 having a vertically arranged base portion 122 and a flange portion 124 having an aperture 126 for journaling the shaft 26. Extending outwardly from the base portion 122 is a C-shaped suspension platform 130 which surrounds the stud 108. The second spider spring 110 closely overfits (covers) the suspension platform 130 and is fixed thereto. The second spider spring 110 is shown with a portion removed for clarity in FIG. 1. Thus, with flexure of the upper spider spring 110 and the lower spider spring 76, the coil support 70 can be moved up and down resiliently with regard to the suspension member 120 and the magnet 50, the magnet 50 secured to the magnet housing. The wall 100 and the upper platform 102 are shaped and arranged to be within the C-shaped suspension platform 130 so as not to interfere therewith during upward travel as shown in FIG. 1.

Figure 2A:
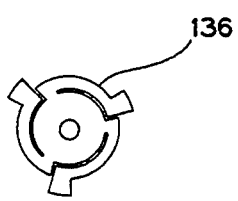
FIG. 2a is a plan view of a portion of the mechanism of FIG. 2.

An adjustment mounting spring 136 connects the shaft 26 to the adjustment plate 40 as shown in FIG. 2A.

Figure 3:
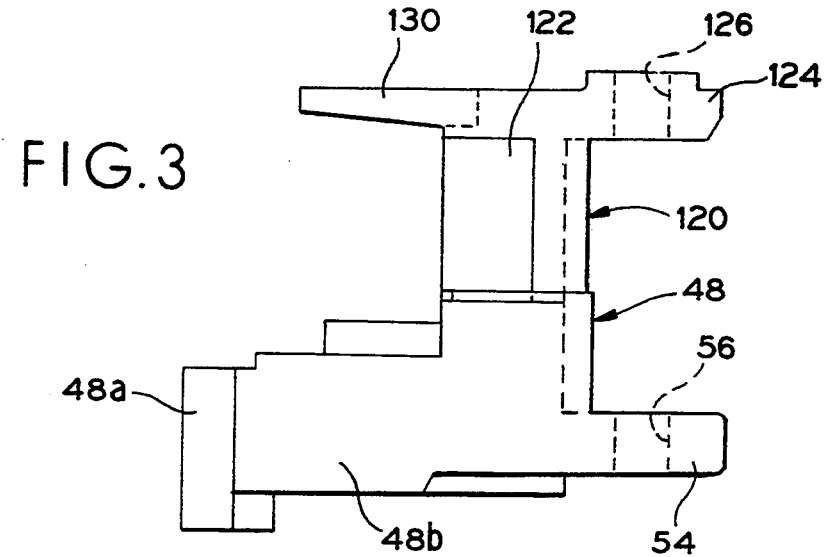
FIG. 3 is an elevational view of a portion of the apparatus of FIG. 1.
Figure 5:
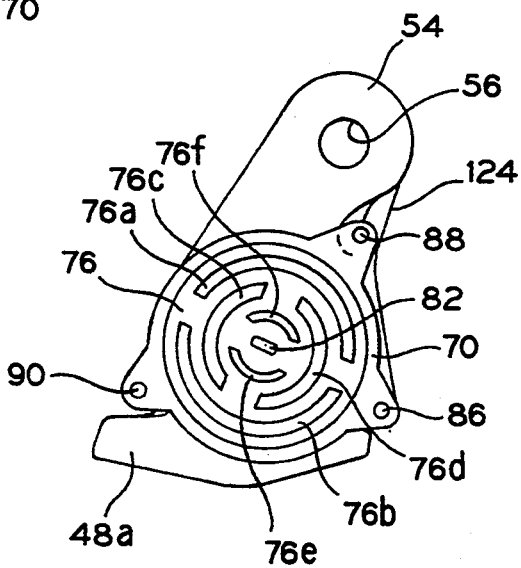
FIG. 5 is a bottom view of a portion of the apparatus of FIG. 1.

FIGS. 3 and 5 illustrate the magnet housing 48 including the front platform 48a integral with a generally cylindrical magnet cylinder 48b. FIG. 5 illustrates the first spider spring which is a thin disk having portions removed to attain radial flexibility. These portions removed are 76a, b, c, d, e and f. The second spider spring 110 is configured similarly, except with a front edge portion removed to correspond to the C-shaped suspension platform 130.

Figure 4:
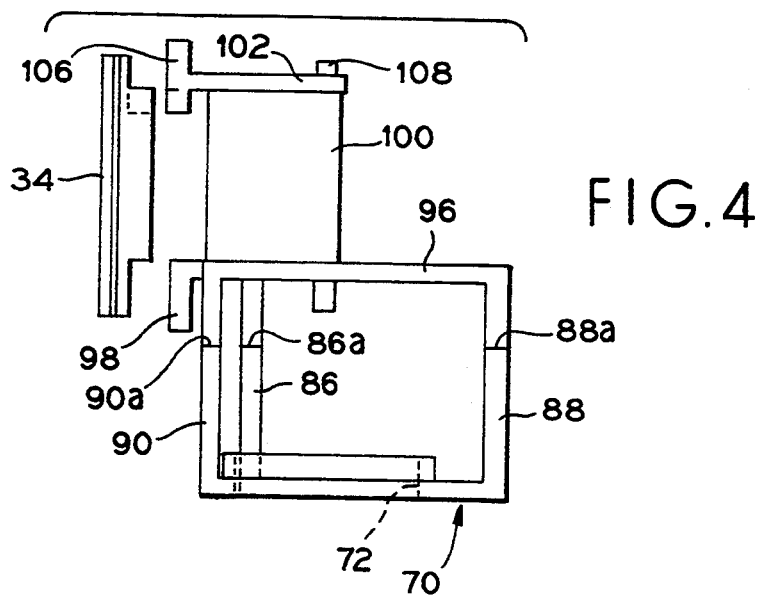
FIG. 4 is a partial exploded view of a portion of the apparatus of FIG. 1.

FIG. 4 illustrates the coil holder 70 which also functions as a head mount. The columns 86, 88 and 90 can have seams 86a, 88a, 90a for installation around the magnet cylinder 48b and subsequently adhesively bonded at the seams 86a, 88a, 90a.

The magnet housing 48 is preferably fashioned of magnetic field shielding material and the suspension 120 can be conveniently fashioned of a like material. The coil support structure 70, columns 86, 88, 90 and platforms 96, 102 can be formed of a plastic material.

Although the present invention has been described with reference to a specific embodiment, those of skill in the art will recognize that changes may be made thereto without departing from the scope and spirit of the invention as set forth in the appended claims.

We claim as our invention:

1. An apparatus for positioning of a magnetic head with respect to a magnetic tape applied thereto, comprising:
    a magnetic head;
    a magnetic head support structure mounted to said magnetic head;
    a magnet;
    a magnet housing surrounding said magnet, said magnet mounted within said magnet housing, and selectively fixed in position;
    a movable coil surrounding said magnet within said magnet housing, said coil connected to said head support structure, movement of said coil positioning said magnetic head with respect to said magnet housing;
    wherein said magnet housing comprises a closed first end and an open second end, and said closed first end is arranged between said magnet and said magnetic head;
    current leads electrically connected to said coil for inducing a select current through said coil;
    wherein said first closed end and said second open end comprise a closed top and an open bottom respectively, and said magnetic head is arranged elevated from said closed top; and
    said magnetic head support structure extending from said magnetic head below said magnet housing, said coil connected to said magnetic head support structure through said open bottom of said magnet housing.

2. The apparatus according to claim 1, comprising a plate spring connecting said magnetic head support structure to said magnet housing.

3. The apparatus according to claim 2, further comprising a fixed suspension connected above said magnet housing and arranged above said magnetic head support structure, and further comprising a second plate spring connecting said magnetic head support structure to said fixed suspension.

4. The apparatus according to claim 1, further comprising a threaded shaft, fixed suspension connected to and arranged above said magnetic housing, wherein said fixed suspension and said magnet housing comprise flanges having aligned apertures for journaling said threaded shaft therebetween; and further comprising a worn wheel surrounding said threaded shaft and engaged to said threaded shaft by internal female threads therein; and a worm gear engaged to said worm wheel, rotation of said worm gear translating said worm wheel upwardly or downwardly on the threaded shaft which translates said flange of said fixed suspension and said magnet housing or downwardly for positioning said magnetic head to select tracks on said magnetic tape.

5. An apparatus for positioning of a magnetic head with respect to a magnetic tape applied thereto, comprising;
    a magnetic head;
    a magnetic head support structure mounted to said magnetic head;
    a magnet;
    a magnet housing said magnet, said magnet mounted within said magnet housing, and selectively fixed in position;
    a movable coil surrounding said magnet within said magnet housing, said coil connected to said head support structure, movement of said coil positioning said magnetic head with respect to said magnet housing;

wherein said magnet housing comprises a closed first end and an open second end, and said closed first end is arranged between said magnet and said magnetic head;

current leads electrically connected to said coil for inducing a select current through said coil; and wherein said magnet housing comprises a damping mechanism engageable by a member protruding from said magnetic head support structure, said damping mechanism acting to retard relative movement between said magnet housing and said magnet head support structure.

6. An apparatus for positioning of a magnetic head with respect to a magnetic tape applied thereto, comprising:

a magnetic head;
a magnetic head support structure mounted to said magnetic head;
a magnet;
a magnet housing surrounding said magnet, said magnet mounted within said magnet housing, and selectively fixed in position;
a movable coil surrounding said magnet within said magnet housing, said coil connected to said head support structure, movement of said coil positioning said magnetic head with respect to said magnet housing;
wherein said magnet housing comprises a closed first end and an open second end, and said closed first end is arranged between said magnet and said magnetic head;
current leads electrically connected to said coil for inducing a select current through said coil; and
wherein said magnetic head support structure extends from said magnetic head to said coil through said second open end.

7. The apparatus according to claim 6, wherein said magnet housing is arranged below said magnetic head; and said magnet housing comprises a magnet cylinder surrounding said magnet, said cylinder offset from said head, and an integral laterally extended front platform arranged directly below said magnetic head.

8. The apparatus according to claim 7, wherein said first closed end and said second open end comprise a closed top end and an open bottom end respectively and said magnetic head support structure extends from said magnetic head below said open bottom end, said coil connected to said magnetic head support structure through said open bottom end.

9. The apparatus according to claim 8 further comprising a spring member connecting said magnetic head support structure to said magnet housing.

10. The apparatus according to claim 9, further comprising a fixed suspension connected to and arranged above said magnet housing and arranged above said magnetic head support structure, and further comprising a second spring member connecting said magnetic head support structure to said fixed suspension.

11. The apparatus according to claim 8, wherein said magnet housing comprises a damping mechanism engageable by a member protruding from said magnetic head support structure, said damping mechanism acting to retard relative movement between said magnet housing and said magnet head support structure.

12. An apparatus for positioning of a magnetic head with respect to magnetic tape applied there to, comprising:

a magnetic head;
a magnet head support structure mounted to said magnetic head;
a magnet;
a magnet housing surrounding said magnet, said magnet mounted within said magnet housing,
a movable coil surrounding said magnet within said magnet housing and movable with respect thereto, one of said coil and said magnet connected to said head support structure, moveable with respect to said magnet housing, the respective other of said coil and said magnetic fixed in position within said magnet housing, movement of said one of said coil and said magnet positioning said magnetic head will respect to said magnet housing;
wherein said magnet housing comprises a closed first end and an open second end, and said closed first end is arranged between said magnet and said magnetic head;
current leads electrically connected to said coil for inducing a select current through said coil;
wherein said first closed end and said second open end comprise a closed top and an open bottom respectively, and said magnetic head is arranged elevated from said close top; and
said magnetic head support structure extending from said magnetic head below said magnet housing, said coil connected to said magnetic head support structure through said open bottom of said magnet housing.

13. The apparatus according to claim 12, comprising a plate spring connecting said magnetic head support structure to said magnet housing.

14. The apparatus according to claim 13, further comprising a fixed suspension connected above said magnet housing and arranged above said magnetic head support structure, and further comprising a second plate spring connecting said magnetic head support structure to said fixed suspension.

15. An apparatus for positioning of a magnetic head with respect to a magnetic tape applied thereto, comprising:

a magnetic head;
a magnetic head support structure mounted to said magnetic head;
a magnet;
a magnet housing surrounding said magnet, said magnet mounted within said magnet housing;
a movable coil adjacent said magnet within said magnet housing and movable with respect thereto, one of said coil and said magnet connected to said head support structure and moveable with respect to said magnet housing, the respective other of said coil and said magnet fixed in position within said magnet housing, movement of said one of said coil and said magnet positioning said magnetic head with respect to said magnet housing;
wherein said magnet housing comprises a closed first end and an open second end, and said closed first end is arranged between said magnet and said magnetic head;
current leads electrically connected to said coil for inducing a select current through said coil; and
wherein said magnet housing comprises a damping mechanism engageable by a member protruding from said magnetic head support structure, said damping mechanism acting to retard relative movement between said magnet housing and said magnet head support structure.

* * * * *